US012343846B2

(12) United States Patent
Martin

(10) Patent No.: US 12,343,846 B2
(45) Date of Patent: Jul. 1, 2025

(54) POWERED COMPRESSION CLAMPING SYSTEM

(71) Applicant: Matt Martin, Bend, OR (US)

(72) Inventor: Matt Martin, Bend, OR (US)

( * ) Notice: Subject to any disclaimer, the term of this patent is extended or adjusted under 35 U.S.C. 154(b) by 653 days.

(21) Appl. No.: 17/470,860

(22) Filed: Sep. 9, 2021

(65) Prior Publication Data

US 2022/0072686 A1 Mar. 10, 2022

Related U.S. Application Data

(60) Provisional application No. 63/076,122, filed on Sep. 9, 2020.

(51) Int. Cl.
*B25B 21/00* (2006.01)
*B25B 5/10* (2006.01)

(52) U.S. Cl.
CPC ............ *B25B 21/002* (2013.01); *B25B 5/102* (2013.01)

(58) Field of Classification Search
CPC ... B25B 21/002; B25B 21/007; B25B 13/065; B25B 13/48; B25B 13/5091; B25B 15/004; B25B 15/008; B25B 13/481; B25B 23/0035
See application file for complete search history.

(56) References Cited

U.S. PATENT DOCUMENTS 2,718,806 A * 9/1955 Clark .................... H01F 7/0257 81/177.85
3,010,346 A * 11/1961 Kulp ................... B25B 13/5091 81/124.2
3,086,414 A * 4/1963 Nardi ....................... F16B 37/16 81/176.1
3,733,938 A * 5/1973 Smith ..................... B25B 13/48 81/124.5
4,823,650 A * 4/1989 Tuttle .................. B25B 13/5091 81/176.15
4,984,489 A * 1/1991 Krauthamer ............ B25B 13/50 81/124.2
5,048,378 A * 9/1991 Nikolas ................... B25B 13/50 81/176.15
5,394,815 A * 3/1995 Hansen ................. B25B 21/007 114/109
5,433,850 A * 7/1995 Murray .................. A01K 59/04 403/348
5,615,587 A * 4/1997 Foerster, Jr. .......... B25B 23/101 81/125
D379,420 S * 5/1997 Standlee ........................... D8/70
5,943,922 A * 8/1999 Rolfe .................. B25B 13/5091 81/124.2
6,010,154 A * 1/2000 Payne ....................... B60S 9/08 81/176.15
6,354,176 B1 * 3/2002 Nordlin ................... B25B 13/06 81/121.1
6,477,924 B1 * 11/2002 Talbot ..................... B25B 13/48 81/176.15
6,715,384 B1 * 4/2004 Kozak ................. B25B 13/5091 81/176.15

(Continued)

*Primary Examiner* — David B. Thomas
(74) *Attorney, Agent, or Firm* — Donn K. Harms

(57) ABSTRACT

A powered compression clamping system is provided by a wrench which is engageable to a power tool such as a drill on a first end. A second end of the wrench has a connector thereon which is configured to removably engage a handle of a clamp to rotate it using the power tool.

2 Claims, 5 Drawing Sheets

(56) References Cited

U.S. PATENT DOCUMENTS

| | | | | |
|---|---|---|---|---|
| 6,901,825 | B1 * | 6/2005 | Lebron | E06B 9/78 81/176.15 |
| 6,948,408 | B1 * | 9/2005 | Lee | F16B 23/0038 81/436 |
| D542,109 | S * | 5/2007 | Lebron | D8/70 |
| 7,210,207 | B1 * | 5/2007 | Frady | B25B 13/48 29/256 |
| 7,281,310 | B2 * | 10/2007 | Moore | E04F 21/26 81/177.85 |
| 7,802,499 | B2 * | 9/2010 | Stephens | B25B 13/065 81/125 |
| D629,820 | S * | 12/2010 | Van Ryswyk | D15/139 |
| 9,931,738 | B2 * | 4/2018 | Greco | B25B 27/0035 |
| 10,193,246 | B1 * | 1/2019 | White | H01R 4/44 |
| 10,259,107 | B2 * | 4/2019 | Wang | B25B 23/0035 |
| 10,625,401 | B1 * | 4/2020 | Kobos | B25B 5/163 |
| 10,953,521 | B2 * | 3/2021 | Zimmermann | B25B 13/065 |
| 10,994,391 | B2 * | 5/2021 | Flory | B25B 13/065 |
| 11,407,088 | B2 * | 8/2022 | Gimondo | B25B 13/5091 |
| 2004/0050218 | A1 * | 3/2004 | Napoli | B25B 13/48 81/176.2 |
| 2005/0126856 | A1 * | 6/2005 | Halonen | E04G 5/02 182/186.8 |
| 2009/0151515 | A1 * | 6/2009 | Veltri | B25B 15/008 81/52 |
| 2012/0060656 | A1 * | 3/2012 | Chang | B25B 23/0035 81/439 |
| 2017/0348834 | A1 * | 12/2017 | Miller | B25B 21/002 |
| 2021/0178557 | A1 * | 6/2021 | Kocur | B66F 13/00 |

* cited by examiner

POWERED COMPRESSION CLAMPING SYSTEM

This application claims priority to U.S. Provisional Patent Application Ser. No. 63/076,122 filed on Sep. 9, 2020, which in included herein in its entirety by this reference thereto.

BACKGROUND OF THE INVENTION

1. Field of the Invention

The invention herein disclosed relates generally to compression clamping systems. More particularly, it relates to a device and system enabling both powered and hand operation of handles employed to operate such clamping systems in woodworking and as widely employed on construction sites.

2. Prior Art

BACKGROUND OF THE INVENTION

In the field of woodworking and construction and other endeavors, compression clamping systems are employed to hold components in appropriate positions temporarily, such as when adhering layers of wood material to each other and to hold components in place which are to be engaged using fasteners. Conventionally, a clamping system is employed for such projects which is configured with mechanical advantage which allows the user to compress components between opposing clamp portions and increase or decrease the compression imparted by the opposing clamps.

For longer distances, where compression of parts, layers, or components is required, such clamping systems conventionally employ opposing jaws which are operatively engaged to gain mechanical advantage during operation, to impart force to components or parts positioned between the jaws. A particularly effective conventional system for such clamping employs a worm gear operatively connected to a handle. When the worm gear is rotated by the user employing the handle, the worm gear is conventionally connected to a translating jaw. Rotation of the worm gear by the handle translates a moving jaw engaged thereto, toward a secondary jaw or mount that is fixed in position. Thus, rotating the conventional handle will rotate the worm or similar gear operatively connected thereto, and move the opposing jaws closer together by rotation of the worm gear with the engaged handle.

In such conventional clamping systems, a first jaw is connected to a first jaw body which is engaged to an elongated member. A worm gear, threadably engaged with a second jaw body, is connected to the second jaw on one end of the worm gear. This second jaw body is positioned on the elongated member to a fixed position thereon. The handle, operatively engaged to the opposing end of the worm gear, allows for rotation thereof in the threaded engagement with the second jaw body, to thereby move the second or translating jaw, toward and away from the first jaw which is fixed in position. The movement of the second jaw toward the first jaw by rotation of the handle engaged with the worm gear will engage and compress components positioned in between the first jaw and the second jaw.

However, such conventional handle and worm gear driven systems can be slow and tedious. Where multiple such clamping systems are located, such as on a construction or job site, the ongoing need to rotate the many handles of each clamping system, can be at best, very time consuming. Users of such conventional systems can also tire of the repetitive motion their hands and arms must endure over time using such systems.

With respect to the above, before explaining at least one preferred embodiment of the powered compression clamping system herein, it is to be understood that the system invention is not limited in its application to the details of employment and to the arrangement of the components or the steps set forth in the following description or illustrated in the drawings. The various components and configurations herein disclosed for the device are capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based, may readily be utilized as a basis for other powered compression clamping systems. It is important, therefore, that the embodiments, objects and claims herein, be regarded as including such equivalent construction and methodology insofar as they do not depart from the spirit and scope of the present invention.

SUMMARY OF THE INVENTION

In this summary description, any directional prepositions if employed, such as up, upwardly, down, downwardly, front, back, top, upper, bottom, lower, left, right and other such terms refer to the device or depictions as they may be oriented are for convenience only in describing such as it appears in the drawings. Such terms of direction and location are not intended to be limiting in any fashion or to imply that the device or method herein has to be used or positioned in any particular orientation. Further, if not otherwise defined, by the term substantially is meant, plus or minus five percent.

The disclosed device herein, provides a clamping system employing a wrench which is operatively engageable to a powered rotation tool, such as an electric or pneumatic drill or impact driver. The system can be provided as a whole system, including the clamping mechanism with a wrench engageable handle and wrench. Alternatively, and more preferred, the system can include a wrench which is configured to engage existing clamping system handles and/or as a handle which is engageable to existing clamping systems and a wrench.

In the most preferred mode of the device herein which has the broadest utility in that it is employable with the existing base of such clamping systems, a wrench is provided for the powered rotation of the handle which translates the clamping system. The wrench is adapted on a first end for this engagement to the powered rotation tool. On an opposing end of the wrench, is positioned a first connector portion which is configured to removably engage to a second connector portion operatively positioned on the handle which is engaged to rotate a worm gear. This rotation of the worm gear will move a translatable second jaw of a clamping component toward and away from a fixed first jaw.

The wrench, in a particularly preferred mode of the system herein, may be configured to both engage a first connector on the wrench with the second connector on the handle and a first connector on the wrench, which will engage existing handles which do not have a second connector thereon. Once engaged to rotate the handle, the wrench will communicate powered rotation to the handle from the powered tool engaged to the wrench.

To provide the grip to the handle to enable powered rotation thereof, opposing slots, formed into sidewalls of the wrench, can be sized to slip over and operatively engage with two portions of the handle. Further, the slots may also be configured with extensions to form an "L" shape or "T" shape such that once powered rotation of the wrench begins, the handle is locked into the extension portion of the slot during rotation in one or both directions. Such will allow users to use the wrench to engage handles having the second connector adapted to engage the first connector of the wrench, and also handles lacking the second connector.

With respect to the above description, before explaining at least one preferred embodiment of the powered compression clamping system herein, it is to be understood that the invention is not limited in its application to the details of operation nor the arrangement of the components or the steps set forth in the following description or illustrations in the drawings. The various methods of implementation and operation of the device herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other devices for carrying out the several purposes of the disclosed powered compression clamping system herein. Therefore, that the objects and claims herein should be regarded as including such equivalent construction, steps, and methodology insofar as they do not depart from the spirit and scope of the present invention.

It is an object of this invention to provide a wrench which may be easily engaged to one or a plurality of handle configurations of a handle employed to rotate a worm gear on a clamping system.

These together with other objects and advantages, which become subsequently apparent reside in the details of the construction and operation of the system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURE

The accompanying drawings which are incorporated in and form a part of this specification illustrate embodiments of the invention and together with the description serve to explain the principles of this invention.

DETAILED DESCRIPTION OF THE PREFERRED EMBODIMENTS OF THE INVENTION

Figure 1:
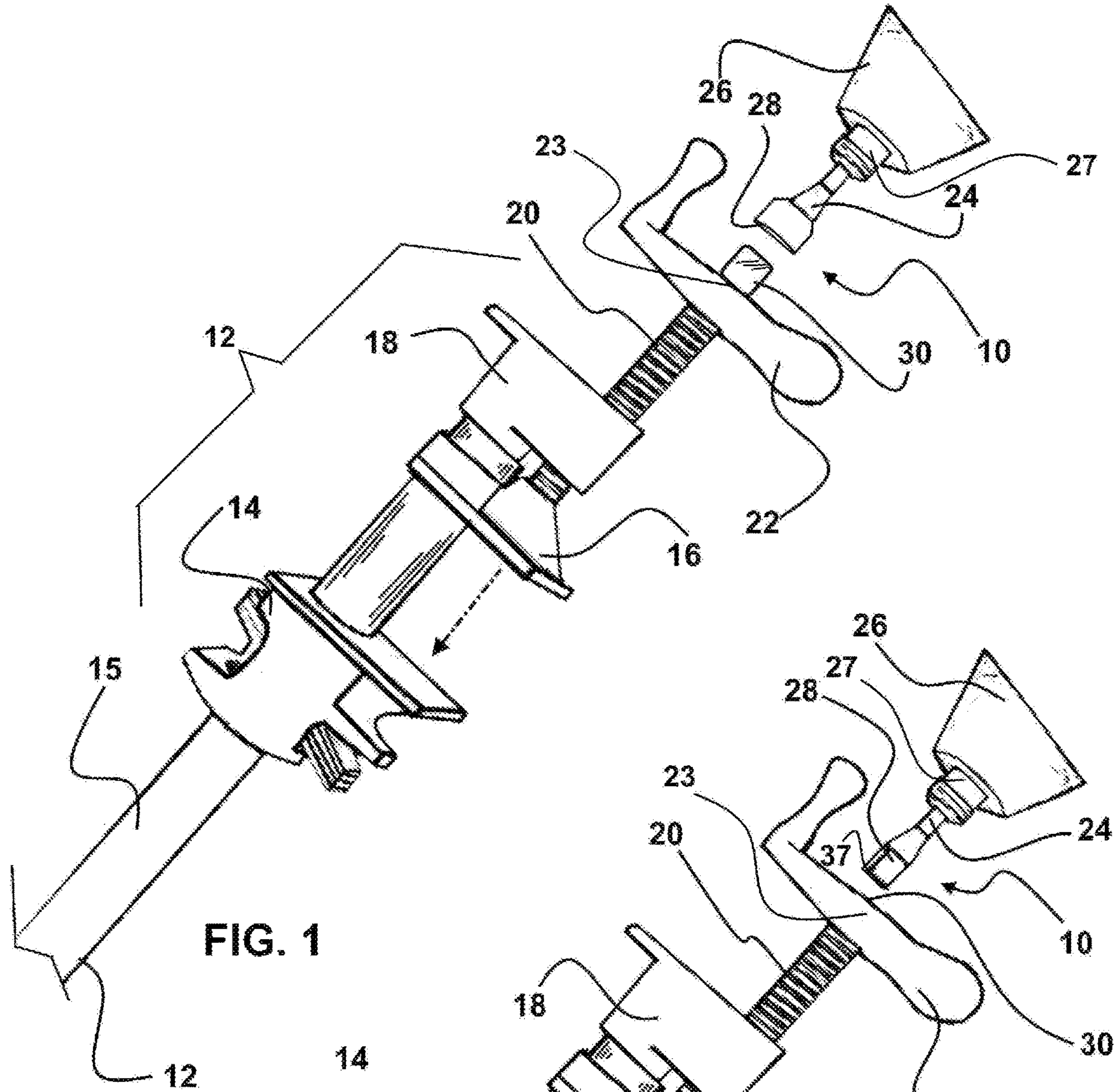
FIG. 1 depicts the handle engageable wrench system herein in a first mode showing the wrench having a first connector portion which is configured to removably engage to a second connector portion operatively positioned on a handle engaged to rotate a worm gear of a conventional clamping system.

In this detailed description, the directional prepositions of up, upwardly, down, downwardly, front, back, top, upper, bottom, lower, left, right and other such terms refer to the device as it is oriented and appears in the drawings and are used for convenience only. Any such terms are not intended to be limiting or to imply that the device has to be used or positioned in any particular orientation.

Referring now to the device 10 herein shown in the depictions of FIGS. 1-12, there is shown in FIG. 1 a conventional clamp 12 which has a first jaw 14 in a fixed engagement to a member 15 such as a pipe. A second jaw 16 is shown slidably engaged on the member 15 adjacent to a body portion 18 which is in a fixed connection to the member 15.

The second jaw 16 is connected to the distal end of a worm gear 20. The worm gear 20 is threadably engaged with the body portion 18 and has a handle 22 connected at a first end of the worm gear 20. Rotation of the handle 22 rotates the worm gear 20 in the threaded engagement and causes the second jaw 16 to move toward or away from the first jaw 14.

Figure 2:
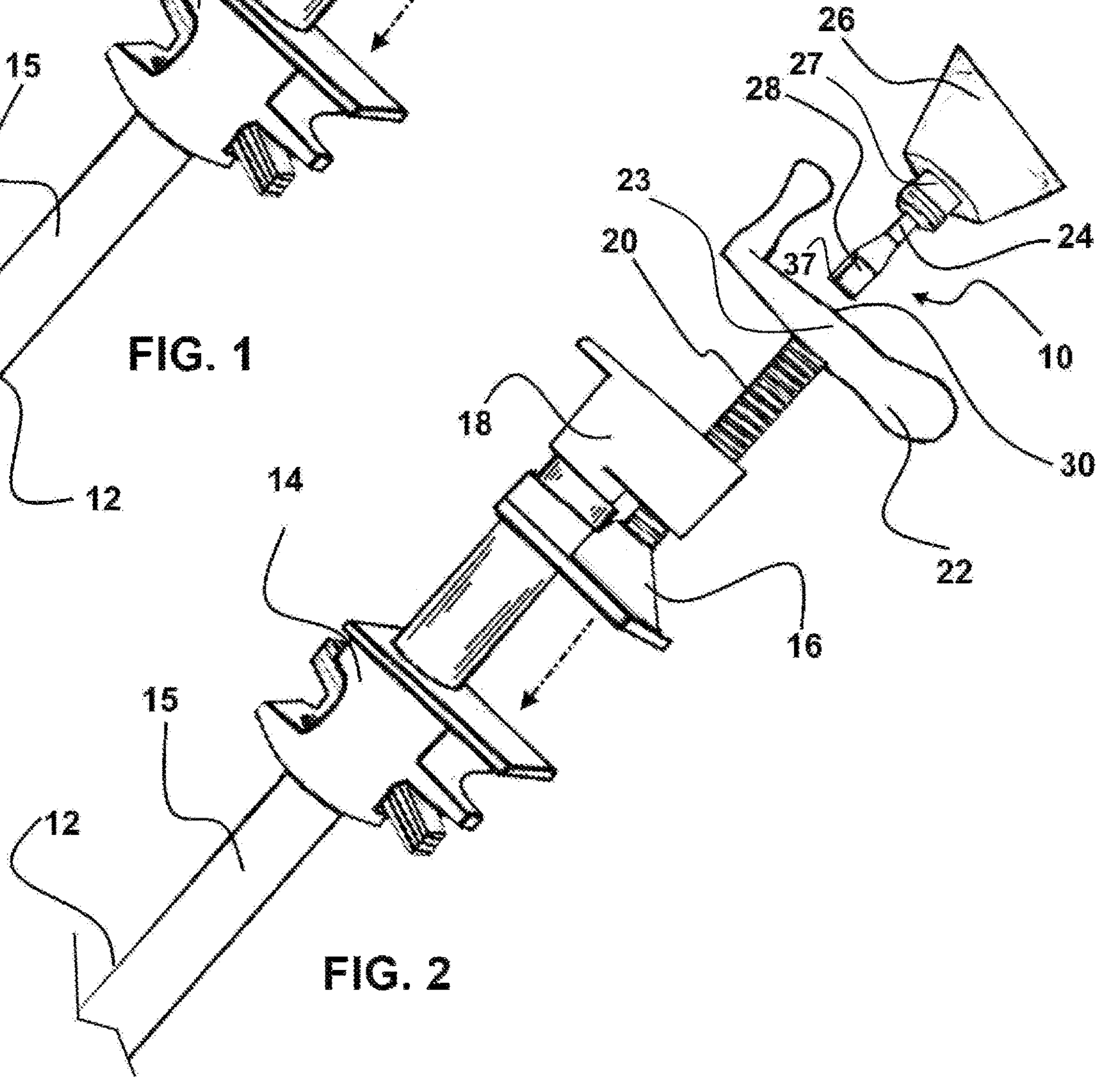
FIG. 2 shows the device depicted in FIG. 1, showing a differing configuration for the first connector positioned on the wrench and the second connector positioned on the handle connected to the worm gear of a conventional clamping system.

As shown in FIGS. 1-2, the device 10 herein, features a wrench 24 which is configured at a first end to be connected to a rotating shaft of a powered rotational tool 26. At a second end of the wrench 24 herein, is positioned a first connecter 28 which is configured in a shape which is complimentary to, and will removably connect to the handle 22, at a connection position 23 on the handle 22 which is substantially aligned with the engagement of the handle 22 to the worm gear 20.

In all modes of the wrench 24 herein, the first connector 28 is configured to automatically removably engage with a connection position 23 upon the handle 22, which is in aligned configuration therewith. By an aligned configuration is meant, a wrench axis 33 is substantially in alignment with a worm gear axis 35 of the rotating worm gear 20. In experimentation it was found that while powered turning of the handle 22 could be imparted by the wrench 24 engaged with the operating power tool 26, to rotate the worm gear 20, a much more secure removable engagement was achieved if the first connector 28 automatically removably engaged with the handle 22 at the connection position. This more secure and aligned engagement provided for less oscillating movement of the hand held power tool 26 during use and minimized accidental disengagements. Such a configuration, which substantially automatically formed a removable engagement at the connection position 23, also was found in experimenting to make it much easier for the user to engage the wrench 24 to the handle 22 without having to look and see it during use, and made it easier to move from handle 22 to handle 22 where a plurality of clamps 12 of the configuration herein are employed on a job site.

Thus, the configuration of the first connector 28 at the second end of the wrench 24, is such that it will engage with the handle 22 at the connection position 23. Further, the noted configuration will guide or move the first connector to the engagement with the connection position 23, during the user action to position the first connector 28 in a removable engagement with the handle 22. Once so engaged, the aligned positioned noted herein minimizes wobbling and oscillating movement of the powered tool 26 during operation thereof. Examples of such self-aligning and positioning configurations of the first connector 28, are shown in FIGS. 5-8 and also shown in the particularly preferred modes of FIGS. 9-12, which should not be considered limiting.

During use of the wrench 24 herein, when the user activates the engaged powered tool 26 such as an electrically powered drill to rotate, the wrench 24 herein, will cause the handle 22 to rotate the connected worm gear 20, and thereby actuate the clamp 12. With the first end of the wrench engaged with the powered tool 26, and the first connector 28 engaged with the handle 22, rotation of the powered tool 26 will rotate the handle 22 and the connected worm gear 20. This action will tighten or loosen the clamp 12 depending on which rotational direction the user has activated the power tool 26 to rotate.

Figure 3:
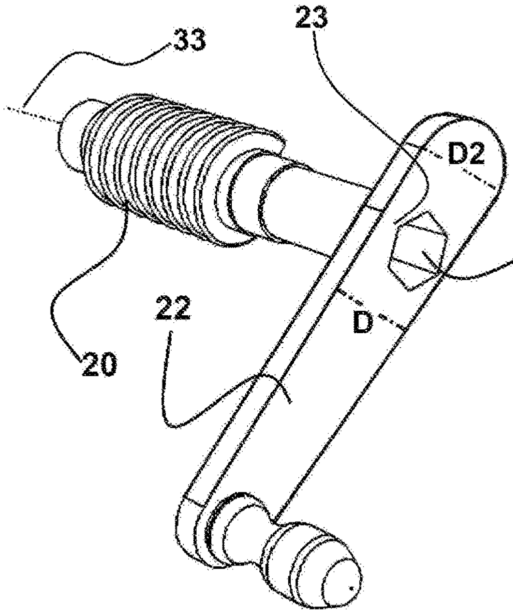
FIG. 3 shows the configuration of the second connector formed as a recess into a center area of the handle which is configured for removable engagement to a projection on the wrench having a mirrored shape to that of the recess.
Figure 4A:
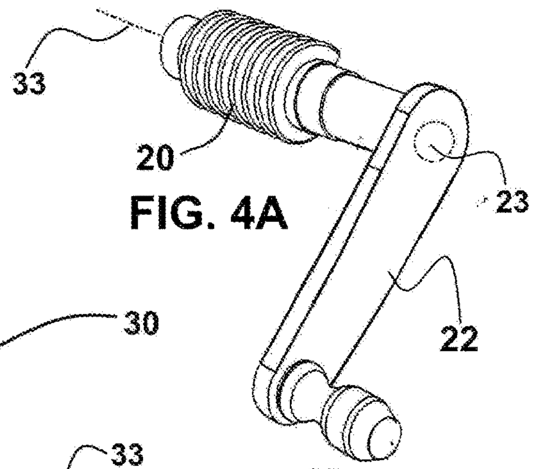
FIG. 4A shows a conventional handle which is engaged to operatively rotate a worm gear of conventional clamps used widely on construction sites where the handle must be conventionally rotated by hand and to which the device herein is adapted to engage to thereby improve operation of existing clamp systems.

In FIG. 3 is shown one favored configuration where the handle 22, which conventionally has no second connector 30 such as shown in FIG. 4A, is fitted with a second connector 30. As shown in FIG. 3, the second connector 30 can be formed as a multi sided recess 31 which is formed into the aligned connection position 23. This recessed form of the second connector 30 is configured to engage a first connector 28, which is formed as a multi sided projection 37 extending from a second end of the wrench 24, which is mirror shaped to that of the recess such as shown in FIG. 2.

Figure 4:
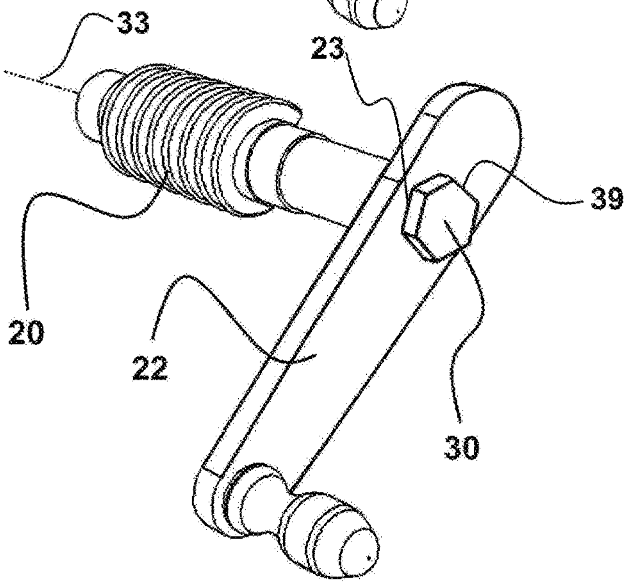
FIG. 4 shows a mode of the second connector positioned on the center area of the handle where the second connector is shaped to engage within a recess on the wrench which has a mirrored shape to that of the projection.

Shown in FIG. 4 is a mode of a conventional clamp handle 22 such as shown in FIG. 4A, where the second connector 30 which is positioned on the center area or connection position 23 of the handle 22, is formed by a multi sided projection 39. The projecting connection 39 has a plurality of planar sides thereon such as in a hexagon shape. This projecting connection 39 mode of the second connector 30 has the configuration of the plurality of sides which are shaped to engage within a multi sided recess 41, forming the first connector 28, which is positioned on the second end of the wrench 24 such as shown, for example, in FIGS. 5-8.

Figure 5:
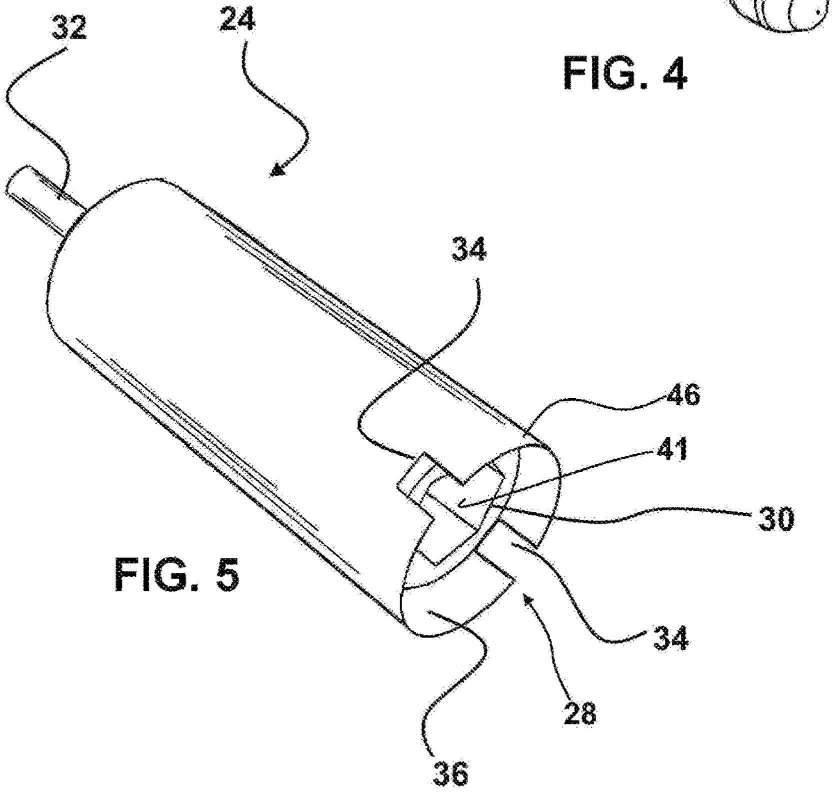
FIG. 5 depicts a mode of the wrench herein having a tool connector on one end adapted to engage with a power tool having a chuck or other engaging connector adapted to engage with the tool connecter, and thereby provide powered rotation to the wrench, and showing the dual handle engaging configuration with both slots and the first connector.

Depicted in FIG. 5 is the wrench 24 in a mode common to all wrenches 24 in FIGS. 5-12 of the device 10 herein, where a tool connector 32 is located at the first end of the wrench 24. The tool connector 32, as noted, is configured to removably engage with the powered tool 26. By removably engage is meant herein, that the tool connector 32 will removably connect with the rotating powered shaft 27 of the powered tool 26 such as by a compressive engagement with a chuck, or by insertion of a mating shaped tool connector 26, into a socket engaged at the end of the rotating shaft 27 of the powered tool 26, or by engagement of a mating recess formed into the tool connector 32 over a projection positioned on the powered shaft 27 of the powered tool 26, or any other removable engagement of the tool connector 32 to a powered tool 26 such as an electric drill or screwdriver or impact wrench or other conventional powered tool 26 used to impart powered rotation.

At the second end of the wrench 24 device herein, such as in FIG. 5 and subsequent figures, is positioned the appropriately formed first connector 28, which is configured in shape and contour to engage with the handle 22 at the connection position 23. Such may be by the positioning of a respective second connector 30 on a handle 22 such as in FIGS. 3-4 which is shaped to engage with the complimentary shaped first connector 28 on the wrench 24 such as in FIGS. 3-4. Particularly preferred, to allow for widespread use of the wrench 24 with conventional handles 22 existing and without change, by forming the first connector 28 to engage with the handle 22, at the connection position 23 such as in FIGS. 9-12.

Additionally shown in FIG. 5 is a slot 34 formed in between a first projecting sidewall portion 36 and second projecting sidewall portion 46. In FIG. 5, the first sidewall 36 and second sidewall 46 positioned on opposite sides of the slot 34, project forward from a second connector 30 shown as a multi sided recess 41. The slot 34 is sized to slide over opposing sides of the handle 22 at the connection position 23. In this mode, should the handle 22 of the clamp 12 lack an appropriately configured second connector 30, the wrench 24 may still engage with and rotate the handle 22 by positioning the opposing side edges of the handle 22 within a respective slot 34. The diameter of the slots 34 would be equal to or slightly larger than the diameter "D" (FIG. 3) of the handle 22. In cases where the handle 22 has angled sides, a portion of the handle 22 diameter D2, on one side of the connection position 23, may be formed larger than a diameter D of the handle on the opposite side of the connection position 23. In such cases, the gap 34 in between the first sidewall 36 and second sidewall 46 may be wider on one end of the gap 34 than the opposite end, to allow for engagement of the wider diameter D2 between the wider gap 34.

Figure 6:
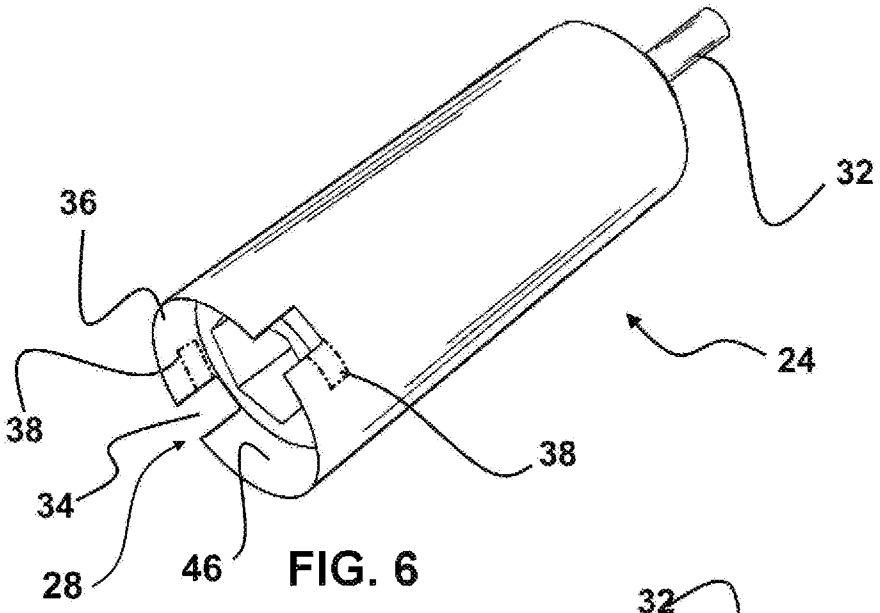
FIG. 6 shows a mode of the wrench herein as in FIG. 5, but showing secondary portions of the slot which may be formed to shape the slot substantially "L" shaped such that sections of the handle will lock into the extensions of the slot during clockwise rotation.

In FIG. 6 is shown another preferred mode of the wrench 24 herein as in FIG. 5, but showing secondary portions 38 of the slot 34 which may be formed in the first sidewall 36 and second sidewall 46. Where the slot 34 extends into these secondary portions 38, it forms the shape of the slot 34 to substantially an "L". The secondary portions 38 of the slot 34, so formed, will engage the handle 22 which will lock into the second portions 38 areas of the slot 34 during clockwise rotation.

Figure 7:
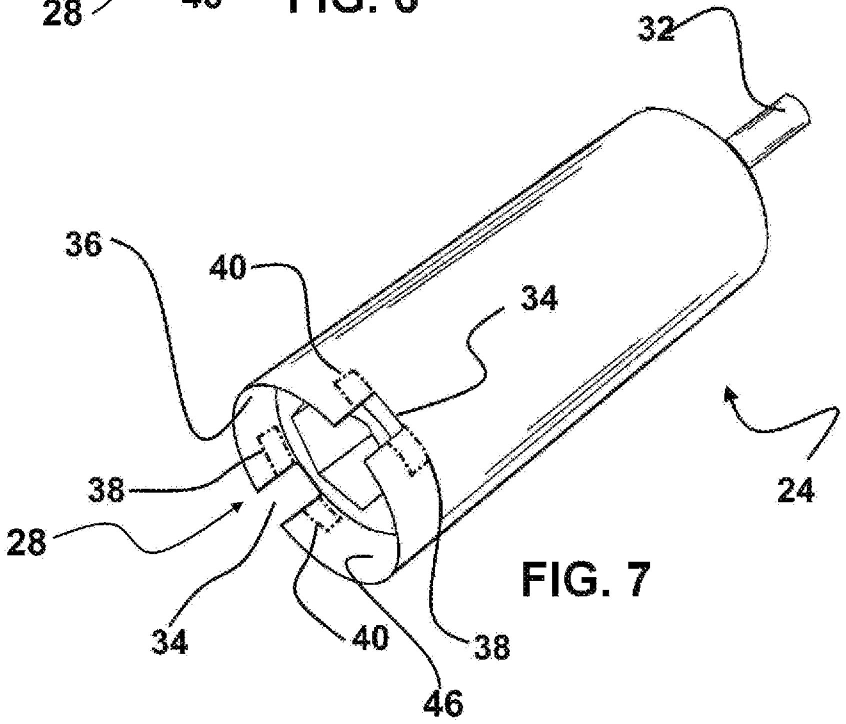
FIG. 7 shows a mode of the wrench herein as in FIG. 5-6, but showing secondary portions of the slot which may be formed to shape the slot substantially "T" shaped such that sections of the handle will lock into the extensions of the slot during both clockwise and counterclockwise rotation.

Depicted in FIG. 7 is another preferred mode of the wrench 24 herein as in FIG. 5-6. In addition to the secondary portions 38 formed at a base area of the slot 34, third portions 40 may be formed in the sidewalls 36 and 46, defining the slot 34. With the secondary portions 38 and third portions 40 of the slot 34 it is substantially formed to a "T" shape. During use, the handle 22 will lock into the secondary portions 38 of the slot 34 during clockwise rotation. The handle will lock into the third portions 40 of the slots 34 during counter clockwise rotation of the wrench 24 and engaged handle.

Figure 8:
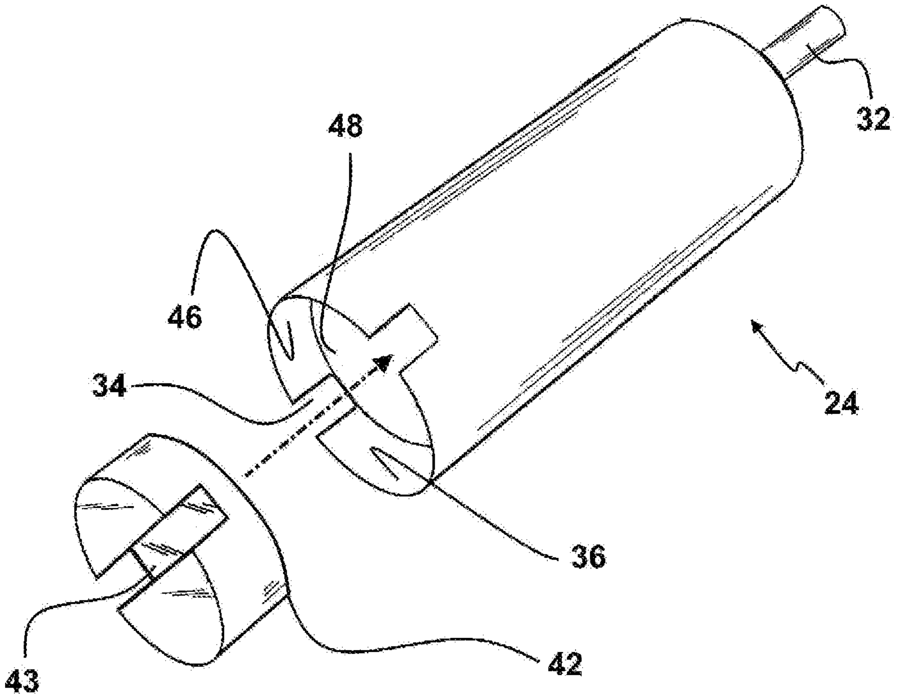
FIG. 8 depicts a mode of the wrench herein similar to that of FIGS. 5-7, but which includes a polymeric insert inserted into the cavity surrounded by the sidewall, and having an insert secondary slot which aligns with the slot formed in opposite sides of the sidewall.
Figure 9:
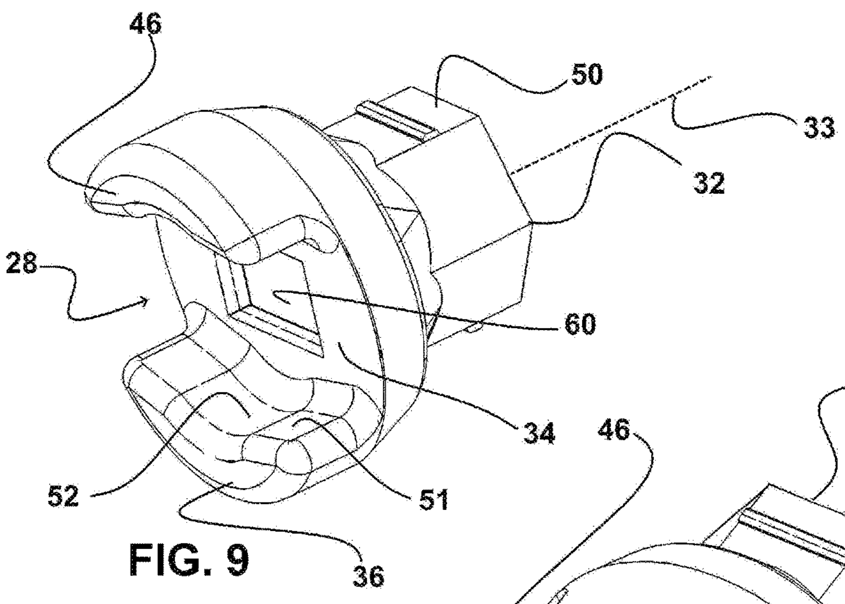
FIGS. 9-12 depict views of an especially preferred mode of the wrench herein which is adapted for engagement to a powered rotating tool at one end and to removably engage the compression components of FIGS. 1-4 to provide powered rotation thereof.
Figure 10:
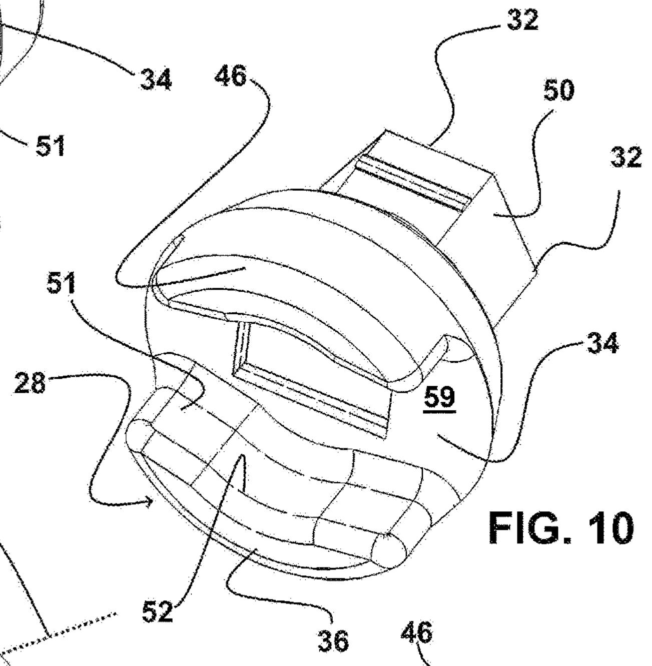

Shown in FIG. 8 is a mode of the wrench herein similar to that of FIGS. 5-7, but which includes an insert 42 which is inserted into the cavity 48 surrounded by the first sidewall 36 and second sidewall 46 positioned on opposite sides of the slot 34. Once the insert 42 is inserted therein, a secondary slot 43 aligns with the slots 34 formed into opposite sides of the sidewall 36.

This mode of the device 10 forms an elongated secondary slot 43 which engages a handle 22 across the entire length of the secondary slot 43. Further, with the insert 42 formed of preferably polymeric material, it may be formed with a circumference of the insert 42 which is slightly larger than an internal circumference of the cavity 48 and compressed during insertion. The result is that the insert 42 will expand and bias against the sidewalls to hold it stationary. So positioned, the insert 42 acts as a vibration damper which reduces the vibration during use and better maintains engagement of the secondary slot 43 as well as the slot 34 formed between the first sidewall 36 and second sidewall 46 during use.

Shown in FIGS. 9-12 are views of an especially preferred mode of the wrench 24 herein which is adapted for engagement to a powered rotating tool 26 with a tool connector 32 at the first end of the wrench 24. The tool connector 32 may be a cylindrical shaft as shown in FIGS. 5-8, or more preferably to prevent slippage over long term use while engaged to the powered tool 26, multiple planner sides are formed on the tool connector 32. In this mode, there is a plurality of at least two side surfaces 50 on opposing sides of the tool connector 32 whereby a drill chuck or the like on the powered tool 26 can compressibly engage.

Also shown in FIGS. 9-12 are the slot 34 communicating in-between the first sidewall 36 and second sidewall 46. An interior surface 51 of the first sidewall 53, as a first recess 52 formed thereon. Positioned across the gap 34, an interior surface 54 of the second sidewall 46 has a second recess 55 positioned therein substantially aligned with the first recess 52.

Figure 11:
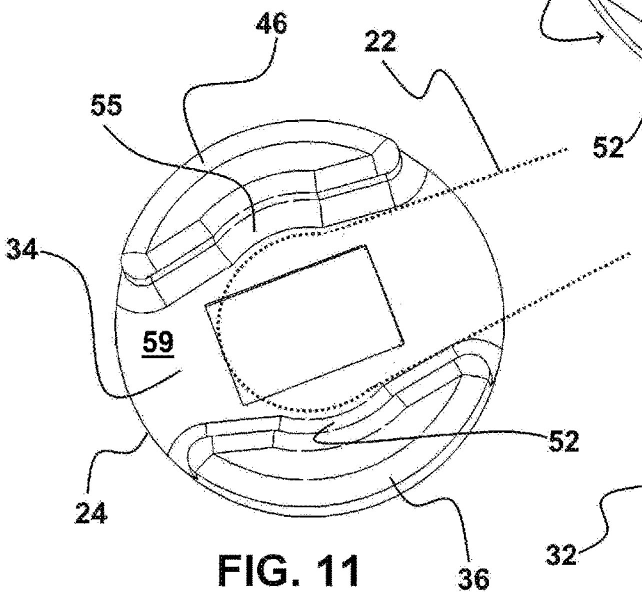
Figure 12:
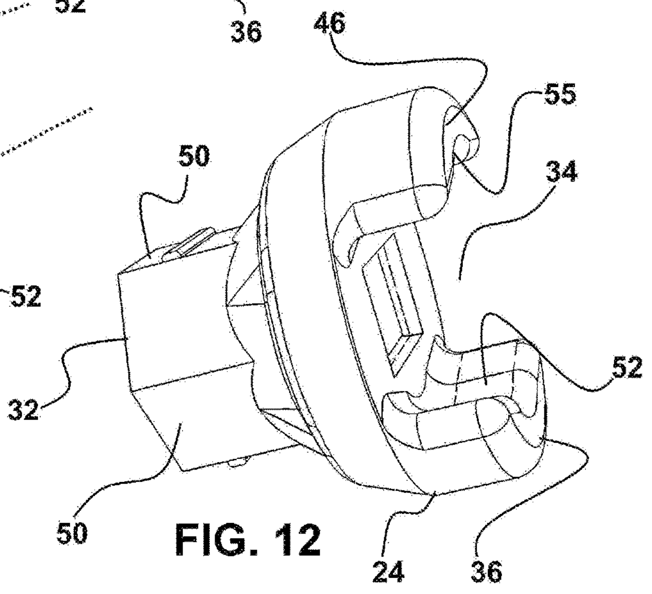

In a mode of the wrench 24 configured to easily engage with existing handles 22 which have various configurations where the edge of the handle at one end of the handle 22, which is in the connection with the worm gear surrounds the connection position 23, (FIG. 11). It was found the formation of the first recess 52 and the second recess 55, across therefrom, formed a pocket which allowed the user to more easily engage upon the end of handle 22. It was also found that the two recesses allowed the user an easier time of maintaining the wrench 24 engaged to the handle 22 during use.

Also shown in FIGS. 9-12 is a centrally positioned third recess 60 formed into a face surface 59 within said gap 34.

This third recess 60 is positioned to surround the wrench axis 33 (FIG. 9) in some modes of the wrench 24. Inclusion of this third recess 60 allows for an easier and more secure removable engagement of the wrench 24 to handles 22 which, on many occasions, will have a projecting nut or projecting weld or other projection, extending from the side surface of the handle 22 substantially at the connection point 23. Such occurs frequently where the handle 22 is bolted or welded to the shaft connected to the worm gear 20 or directly thereto. Thus, inclusion of this third recess 60 will allow the user to more easily position the wrench 24 on the handle 22 and maintain it in the removable engagement thereto, where the third recess 60 provides space to accommodate such projections on existing handles 22 therein. This accommodation of such projections allows the first sidewall 36 and second sidewall 46 to slide more complexly on and around the opposing side edges of the handle 22 to be rotated.

While all of the fundamental characteristics and features of the powered compression clamping system have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Still further, the system herein and/or components thereof, may be included in OEM clamp systems as sold new, or may be a retrofit to existing such clamp systems. Consequently, all such modifications and variations and substitutions are included within the scope of the invention as defined by the following claims.

What is claimed is:

1. A wrench for imparting powered rotation to a rotating handle operatively engaged to operate a clamp, comprising:

a wrench having a first end and having a second end opposite said first end thereof;

said first end of said wrench having a tool connector thereon;

said second end of said wrench having a first connector thereon;

said tool connector engageable to a rotating powered shaft of a power tool;

said first connector having a first sidewall extending from a face surface, said face surface being coupled to said tool connector;

said first sidewall extending between a first end thereof to a second end thereof;

said first connector having a second sidewall extending from said face surface, said second sidewall extending between a first end thereof positioned upon an opposite side of a slot from said first end of said first sidewall, to a second end thereof positioned on an opposite side of said slot from said second end of said first sidewall;

a central area of said slot positioned in between a central area of said first sidewall and a central area of said second sidewall;

said central area of said slot configured to form a removable engagement at a connection position at a first end of a rotating handle having a second portion of said handle which extends through said slot to a second end thereof projecting from said slot;

said slot positioned between said a first interior surface of said first sidewall and a second interior surface of said second sidewall located on an opposite side of said slot from said first interior surface;

said removable engagement of said connection position of said handle formed by contact of said first interior surface against a first side of said handle and said second interior surface against a second side of said handle opposite said first side;

a first recess formed into said first interior surface opposite a second recess formed into said second interior surface opposite said first recess;

an area within said slot between said first recess and said second recess defining a pocket for positioning said connection position of said handle therein in said removable engagement therewith;

a third recess formed into said face surface, said third recess positioned in between and aligned with said first recess and said second recess;

said third recess defining an area for positioning of projections extending from said handle therein; and wherein, with said central area of said slot of said first connector in said removable engagement with said connection position, actuation of said power tool to rotate said powered shaft imparts a powered rotation to said handle.

2. The wrench of claim 1, additionally comprising: said tool connector having a plurality of planar surfaces thereon.

* * * * *